Figure 1:
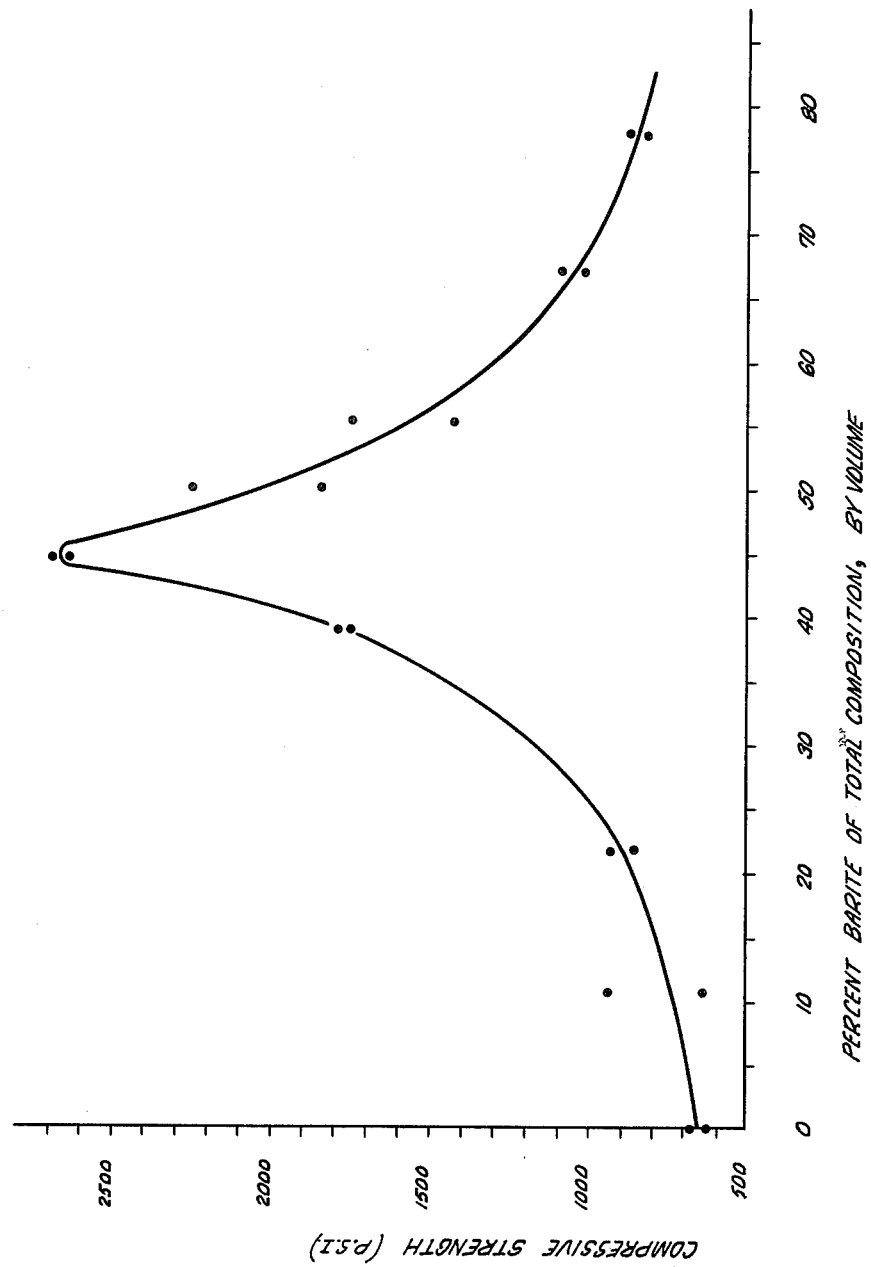

Oct. 31, 1961  O. W. ATKIN  3,006,777
BUILDING MATERIALS
Filed Aug. 22, 1960  3 Sheets-Sheet 1

INVENTOR.
OWEN W. ATKIN
BY
Christie, Parker & Hale
ATTORNEYS.

Oct. 31, 1961

O. W. ATKIN 3,006,777

BUILDING MATERIALS

Filed Aug. 22, 1960

3 Sheets-Sheet 3

INVENTOR.
OWEN W. ATKIN
BY
Christie Parker & Hale
ATTORNEYS.

3,006,777
BUILDING MATERIALS
Owen W. Atkin, Henderson, Nev., assignor to American Nuclear Shield Corporation, Reno, Nev., a corporation of Nevada
Filed Aug. 22, 1960, Ser. No. 51,073
3 Claims. (Cl. 106—97)

This invention relates to building materials, and more particularly to building materials mixed in a slurry which has a matrix like Portland cement or various clays. The present application is a continuation-in-part of U.S. application Serial No. 803,140 filed March 31, 1959, now abandoned.

Building materials encompass a wide range of products from wood to metals. This application and its invention are concerned with building materials such as concrete walls and concrete blocks, fired and unfired bricks, siding and roofing materials such as asbestos shingles, wall surfaces such as gypsum mixtures and other like materials generally comprising the combination of calcareous cements or other binders and varying conventional aggregates of rock and mineral particles.

I have invented a composition of matter for building materials which results in greatly increased strength both in compression and tension. My invention resides in the discovery that the addition of certain proportions of barite to the conventional building material mixture greatly increases the strength of the resulting building material over and above what strength it would have if the barite was not added. Strength increases of fourfold and more have been observed.

In accordance with the present invention, a composition of matter for building materials consists essentially of a conventional aggregate and binder, and barium sulphate particles sufficient to constitute between about 40% and 50% by volume of dry ingredients.

Tests indicate that, as the barite proportion increases slightly above 30% or decreases slightly below 60%, strength increases very sharply. Thus exceptionally high strength occurs at and between say about 40% and 50% of barite by total volume, with the peak strength occurring generally at about 45%.

There are many factors affecting the strength of a building material. For example, some of the major ones for ordinary concrete are cleanliness of the aggregate, the curing time allowed, and the proportion of cement in the mixture. Increasing the strength by adding more cement to the mixture is, of course, possible; however, it is relatively expensive because cement costs many times as much as aggregate material. In accordance with the present invention, however, it is possible to use a low proportion of cement, increasing the strength of the material by employing a proper proportion of barite in the mix. Since barite costs about one-third as much as cement, the economic advantages are tremendous in the bulk building materials industry.

As far as is known, this strength increasing effect produced by substantial quantities of barite is previously unkown. While barite has in some instances been added to building materials, such addition has been either in such small quantities or such excessive quantities as to render strength increasing effect so minor as to be unnoticeable in the light of other factors affecting strength. An example of the employment of substantial quantities of barite is as taught in a patent to Harth, U.S. Patent No. 1,576,730, issued March 16, 1926, where the objective is to provide a special X-ray shield by employing pure barite with sufficient cement to hold it together. The Harth concept is the use of as much barite as feasible, and a range of 67% to 75% barite by volume of the total composition is taught, with no indication of any effects on strength.

Laboratory tests have confirmed that the inclusion of barium sulphate in a certain range of proportions results in an unusual increase in strength of the resulting building material, whether the binder be a cement such as Portland, a gypsum lime, or various alumina clays as found in shale or adobe. Apparently this additional strength effect is produced in conventional building materials, regardless of the particular conventional binder or aggregate employed, although the particular binder or aggregate composition other than the barium sulphate also effects the strength of the materials as is well known.

Figure 2:
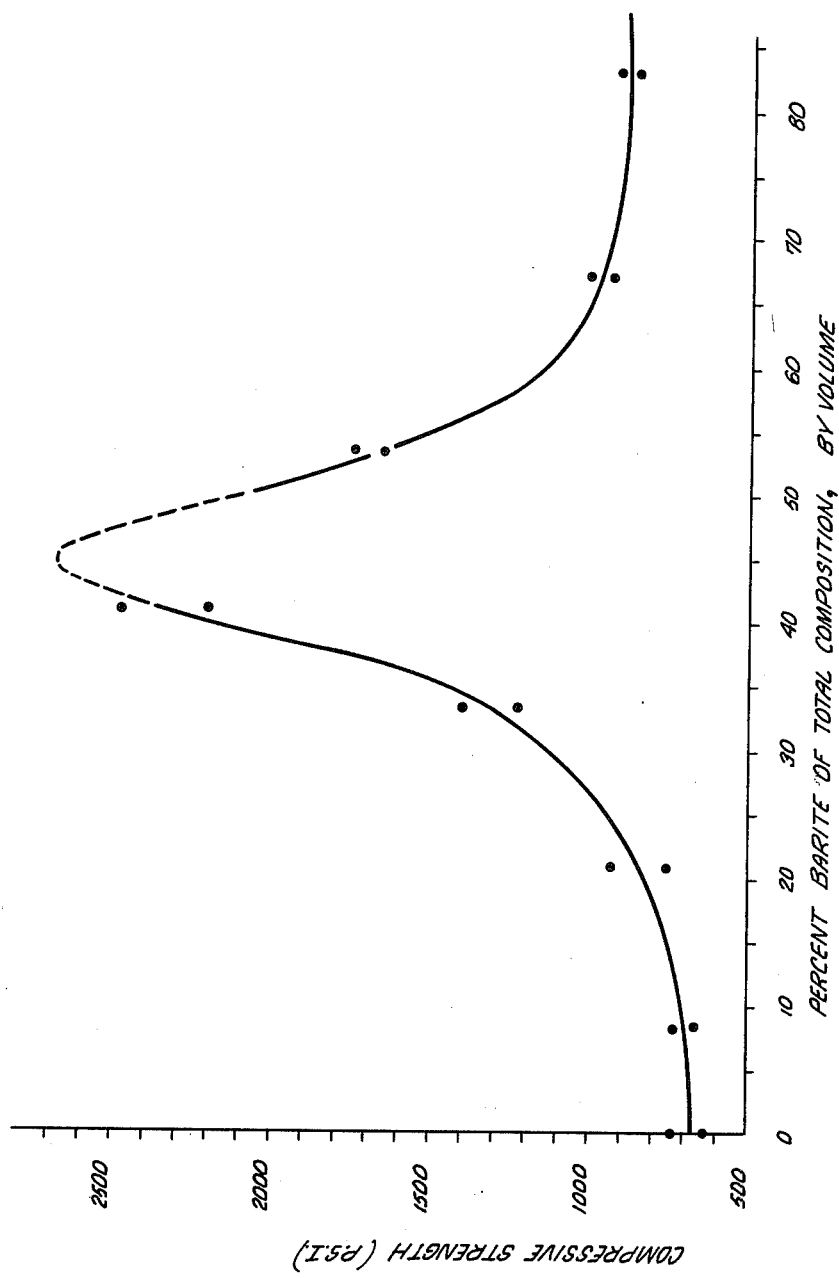
Figure 3:
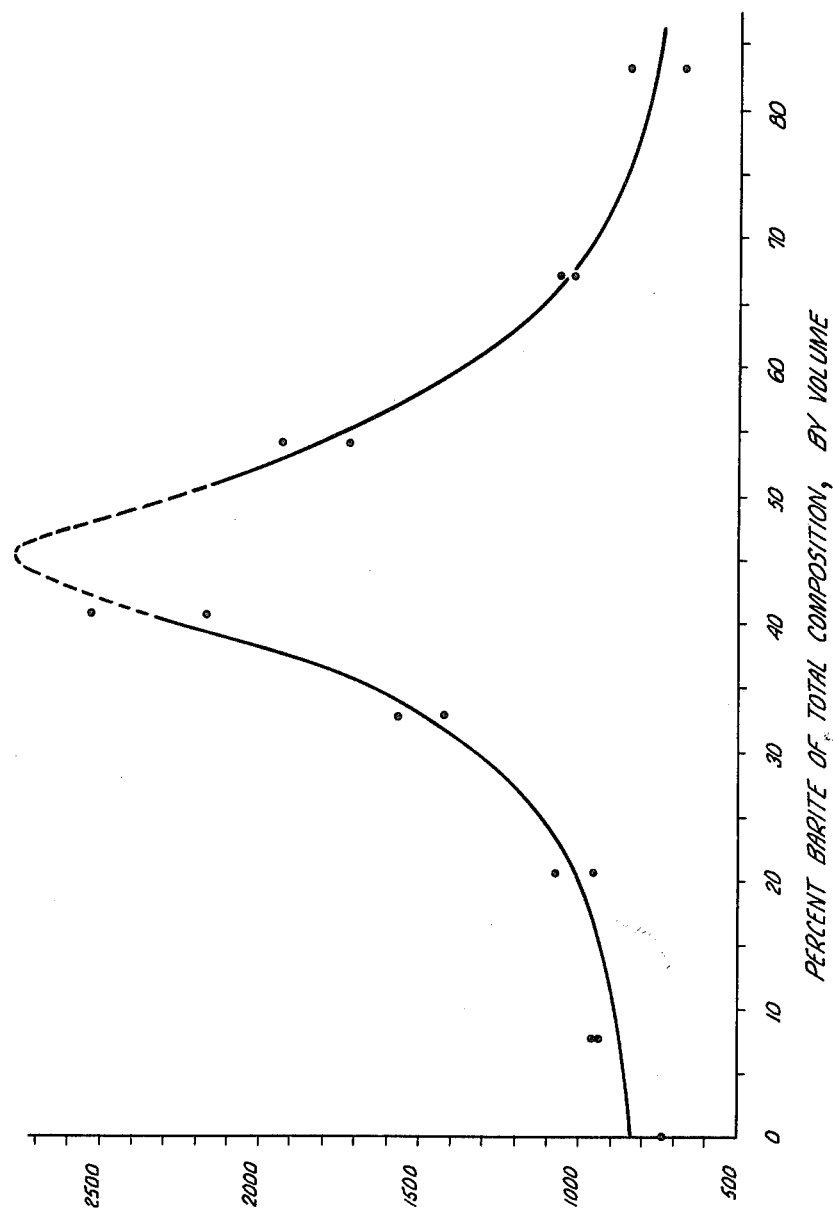

Typical test results are illustrated in the accompanying drawings in which:

FIG. 1 is a graph with accompanying legend, illustrating compressive strength test results of a first conventional building material mixture as related to the quantity of barite contained in the mixture;

FIG. 2 is a graph and accompanying legend illustrating compressive strength test results of a second building material mixture as related to the inclusion of varying proportions of barite in the mixture; and, FIG. 3 is a graph and accompanying legend illustrating compressive strength test results of a third conventional building material mixture as related to the inclusion of varying proportions of barite.

The graphs in the drawings represent compression tests of 2″ x 4″ cylindrical specimens. The tests were made by Pacific Materials Laboratory, Inc. of San Bernardino, California, an independent building materials testing laboratory. Except for the mixture proportions of barite and aggregate, all factors affecting strength, including the cement proportion, were held constant throughout each test. All cylinders were cured for seven days after being made up in the same conventional fashion of mixing dry ingredients with similar amounts of water. In varying the barite percentage by substituting barite for the conventional normal concrete aggregate, an attempt was made to substitute as evenly as possible for both the gravel and sand size particles.

Therefore, within each test, and except for experimental error, the only factor causing the strength to vary is the presence of a varying degree of barite.

The FIG. 1, FIG. 2, and FIG. 3 graphs were constructed from the following tabulated test results furnished by Pacific Materials Laboratory, Inc.

FIG. 1 TEST RESULTS

[Mix: 1 part Portland cement, 3 parts sand, 5 parts pea gravel (1:3:5)]

| Percent Barite | Parts Sand | | Parts Pea Gravel | | Strength (p.s.i.) |
|---|---|---|---|---|---|
| | Regular | Barite | Regular | Barite | |
| 0 | 3 | 0 | 5 | 0 | 630 / 674 |
| 11 | 2½ | ½ | 4½ | ½ | 935 / 637 |
| 22 | 2¼ | ¾ | 3¾ | 1¼ | 873 / 925 |
| 39 | 1¾ | 1¼ | 2¾ | 2¼ | 1,760 / 1,780 |
| 44½ | 1½ | 1½ | 2½ | 2½ | 2,680 / 2,640 |
| 50 | 1¼ | 1¾ | 2¼ | 2¾ | 1,840 / 2,230 |
| 55½ | 2 | 2 | 3 | 2 | 1,750 / 1,410 |
| 67 | ¾ | 2¼ | 1¼ | 3¾ | 1,040 / 1,095 |
| 78 | ¼ | 2¾ | ¾ | 4¼ | 867 / 810 |

FIG. 2 TEST RESULTS

[Mix: 1 part Portland cement, 2 parts sand, 3 parts pea gravel (1:2:3)]

| Percent Barite | Parts Sand | | Parts Pea Gravel | | Strength (p.s.i.) |
|---|---|---|---|---|---|
| | Regular | Barite | Regular | Barite | |
| 0 | 2 | 0 | 3 | 0 | 625 / 740 |
| 8 | 1¾ | ¼ | 2¾ | ¼ | 663 / 714 |
| 21 | 1½ | ½ | 2¼ | ¾ | 785 / 935 |
| 33 | 1¼ | ¾ | 1¾ | 1¼ | 1,400 / 1,210 |
| 41 | 1 | 1 | 1½ | 1½ | 2,200 / 2,490 |
| 54 | ¾ | 1¼ | 1 | 2 | 1,750 / 1,680 |
| 67 | ½ | 1½ | ½ | 2½ | 1,005 / 962 |
| 83 | 0 | 2 | 0 | 3 | 885 / 905 |

FIG. 3 TEST RESULTS

[Mix: 1 part Portland cement, 5 parts sand (1:5)]

| Percent Barite | Parts Sand | | Strength (p.s.i.) |
|---|---|---|---|
| | Regular | Barite | |
| 0 | 5 | 0 | 727 / 930 |
| 8 | 4½ | ½ | 935 / 1,095 |
| 21 | 3¾ | 1¼ | 970 / 1,570 |
| 33 | 3 | 2 | 1,420 / 2,190 |
| 41 | 2½ | 2½ | 2,510 / 1,950 |
| 54 | 1¾ | 3¼ | 1,710 / 1,090 |
| 67 | 1 | 4 | 1,030 / 854 |
| 83 | 0 | 5 | 689 |

In the drawings, two similar specimens are represented by the two plotted points at each different percentage of barite tested, except for the 0% point in FIG. 3 which was an oversight. In constructing the curves, an attempt was made to draw a smooth curve which passes midway between each pair of points, as is the conventional practice. In FIGS. 2 and 3, the point of maximum strength was apparently not tested, which accounts for the dotted line portions of these curves.

An examination of the three curves shows that the test results are consistent with the previously mentioned percentage ranges for the barite. The relatively low beginning strength of the specimens, indicated at 0% on the curves, is attributable to several factors: Only a 7 day curing period was allowed; a poor quality (unwashed) aggregate was employed; and, in FIG. 1 the cement proportion is only about 11% by volume of the ingredients and, in FIGS. 2 and 3, the cement proportion is only about 16%. However, the strength increase resulting from barite is similary present when richer cement proportions and high quality aggregates are employed and longer curing times are allowed.

I claim:

1. A building material composition which consists essentially of a conventional aggregate, barium sulphate particles, and a binder selected from the group consisting of Portland cement, clay and gypsum lime, the barium sulphate constituting about 40% to 50% by volume of dry ingredients.

2. The composition of claim 1, wherein the binder is Portland cement.

3. A building material composition which consists essentially of a conventional aggregate, barium sulphate particles, and a binder selected from the group consisting of Portland cement, clay and gypsum lime, the barium sulphate constituting approximately 45% by volume of dry ingredients.

References Cited in the file of this patent

UNITED STATES PATENTS

| 1,576,730 | Harth | Mar. 16, 1926 |
| 2,961,399 | Alberti | Nov. 22, 1960 |

FOREIGN PATENTS

| 1,302 | Great Britain | 1879 |

OTHER REFERENCES

Sante et al.: American J. of Roentgenology & Radium Therapy, April 1925 (pages 383–4).

Witte et al.: J. Amer. Concrete Inst., vol. 51, September 1954 (pages 65–88), "Properties of Heavy Concrete Made with Barite Aggregates."